(12) United States Patent
Hou et al.

(10) Patent No.: US 10,462,071 B2
(45) Date of Patent: Oct. 29, 2019

(54) METHOD AND DEVICE FOR REMOVING A CONTROL RELATIONSHIP BETWEEN A USER ACCOUNT AND A DEVICE

(71) Applicant: Xiaomi Inc., Beijing (CN)

(72) Inventors: Enxing Hou, Beijing (CN); Qiao Ren, Beijing (CN); Feiyun Li, Beijing (CN)

(73) Assignee: XIAOMI INC., Beijing (CN)

( * ) Notice: Subject to any disclaimer, the term of this patent is extended or adjusted under 35 U.S.C. 154(b) by 432 days.

(21) Appl. No.: 15/174,611

(22) Filed: Jun. 6, 2016

(65) Prior Publication Data

US 2017/0085499 A1 Mar. 23, 2017

(30) Foreign Application Priority Data

Sep. 17, 2015 (CN) .......................... 2015 1 0595907

(51) Int. Cl.
*G06F 15/173* (2006.01)
*H04L 12/911* (2013.01)
(Continued)

(52) U.S. Cl.
CPC .......... *H04L 47/82* (2013.01); *H04L 12/4641* (2013.01); *H04L 41/12* (2013.01); *H04L 67/10* (2013.01); *H04L 67/306* (2013.01)

(58) Field of Classification Search
CPC ....... H04L 63/08; H04L 63/101; H04L 67/22; H04W 12/08
See application file for complete search history.

(56) References Cited

U.S. PATENT DOCUMENTS 7,921,179 B1 * 4/2011 Zheng ................. H04L 67/1097
709/213
8,312,013 B1 * 11/2012 Smith ................... G06F 16/211
707/726
(Continued)

FOREIGN PATENT DOCUMENTS

CN 103391220 A 11/2013
CN 103401911 A 11/2013
(Continued)

OTHER PUBLICATIONS

Belimpasakis, et al., A survey of techniques for remote access to home networks and resources, 2014, Multimed Tools Appl, pp. 1-42 (Year: 2014).*

(Continued)

*Primary Examiner* — Oleg Survillo
(74) *Attorney, Agent, or Firm* — Brinks Gilson & Lione

(57) ABSTRACT

A method may include receiving a removal request from a first user account, the removal request configured to request removal of a control relationship between the first user account and a device. A method may further include determining whether the first user account is an owner account of the device or a share account of the device. A method may further include retrieving a first share account corresponding to the device, the first share account being an account having permission to control the device, wherein the permission to control the device has been shared with the first share account by a user account different from the first share account. A method may further include removing a full control relationship between the owner account and the device. A method may further include removing a limited control relationship between the first share account and the device.

20 Claims, 6 Drawing Sheets

(51) Int. Cl.
*H04L 12/24* (2006.01)
*H04L 29/08* (2006.01)
*H04L 12/46* (2006.01)

(56) References Cited

U.S. PATENT DOCUMENTS

| | | | |
|---|---|---|---|
| 2002/0026592 A1* | 2/2002 | Gavrila | G06F 21/6218 726/6 |
| 2002/0049806 A1* | 4/2002 | Gatz | G06F 21/62 709/203 |
| 2004/0088737 A1* | 5/2004 | Donlan | H04N 7/165 725/135 |
| 2004/0196491 A1* | 10/2004 | Uchino | G06F 21/608 358/1.15 |
| 2005/0134431 A1 | 6/2005 | Perez-Garcia et al. | |
| 2008/0243936 A1* | 10/2008 | Li | G06F 16/1734 |
| 2010/0023491 A1* | 1/2010 | Huang | H04L 41/28 707/E17.014 |
| 2010/0125652 A1 | 5/2010 | Rantapuska et al. | |
| 2013/0304923 A1 | 11/2013 | Clay et al. | |
| 2014/0012922 A1* | 1/2014 | Wu | G06F 16/972 709/205 |
| 2014/0258418 A1* | 9/2014 | Subramani | H04L 67/1095 709/205 |
| 2015/0095979 A1* | 4/2015 | Windust | H04L 63/10 726/3 |
| 2015/0213355 A1* | 7/2015 | Sharma | G06N 3/006 706/11 |
| 2015/0222604 A1* | 8/2015 | Ylonen | H04L 63/062 713/171 |
| 2015/0270980 A1* | 9/2015 | Lection | H04L 51/10 709/204 |
| 2015/0324467 A1* | 11/2015 | Belton, Jr. | G06F 21/6218 707/722 |
| 2015/0350220 A1* | 12/2015 | Espinosa | H04L 63/102 726/28 |
| 2015/0379294 A1* | 12/2015 | Cohen | G06F 16/93 726/28 |
| 2016/0065571 A1* | 3/2016 | Hoyos | H04L 63/0861 713/168 |
| 2016/0295005 A1* | 10/2016 | Schussmann | H04W 4/70 |
| 2016/0357497 A1* | 12/2016 | Hu | H04L 67/141 |

FOREIGN PATENT DOCUMENTS

| | | |
|---|---|---|
| CN | 103616860 A | 3/2014 |
| CN | 103945268 A | 7/2014 |
| CN | 104580176 A | 4/2015 |
| CN | 104683700 A | 6/2015 |
| CN | 104735057 A | 6/2015 |
| CN | 104808501 A | 7/2015 |
| CN | 104809369 A | 7/2015 |
| CN | 104852990 A | 8/2015 |
| CN | 105162668 A | 12/2015 |
| JP | 2001-297028 A | 10/2001 |
| JP | 2009-230249 A | 10/2009 |
| JP | 2015-111752 A | 6/2015 |
| KR | 10-2010-0103337 A | 9/2010 |
| KR | 10-2012-0080860 A | 7/2012 |
| KR | 10-2015-0031476 A | 3/2015 |
| RU | 2 409 853 C2 | 1/2011 |
| RU | 2 449 346 C1 | 4/2012 |
| WO | WO 2007/137368 A1 | 12/2007 |

OTHER PUBLICATIONS

Hyun-Jin Kim, et al., Access right assignment mechanisms for secure home networks, Apr. 2011, Journal of communications and networks, vol. 13, No. 2, pp. 1-12 (Year: 2011).*
English Translation of International Search Report dated Jun. 14, 2016 for International Application No. PCT/CN2015/099392, 4 pages.
Office Action dated Dec. 1, 2017 for Chinese Application No. 201510595907.1, 5 pages.
Office Action dated Aug. 21, 2017 for Russian Application No. 2016116764/08, 11 pages.
European Search Report dated Aug. 19, 2016 for European Application No. 16165496.7, 8 pages.
International Search Report dated Jun. 14, 2016 for International Application No. PCT/CN2015/099392, 4 pages.
Office Action dated Dec. 5, 2017 for Japanese Application No. 2017-539491, 2 pages.
Notice of Allowance dated Apr. 28, 2018 for Korean Application No. 10-2016-7006942, 2 pages.

* cited by examiner

METHOD AND DEVICE FOR REMOVING A CONTROL RELATIONSHIP BETWEEN A USER ACCOUNT AND A DEVICE

CROSS-REFERENCE TO RELATED APPLICATIONS

The present application is based upon and claims priority to Chinese Patent Application No. 201510595907.1 filed Sep. 17, 2015, the entire contents of which are incorporated herein by reference.

TECHNICAL FIELD

The present disclosure generally relates to the field of smart homes, and more particularly, to methods and devices for removing a control relationship between a user account and a device.

BACKGROUND

In the field of smart homes, an owner of a device, for example a smart device, may establish a full control relationship with the device and thus obtain dominant permission to control various aspects of the device.

The owner of the device may share permissions to control one or more of those aspects of the device with other family members, such that accounts of the other family members can establish limited control relationships with the device. For example, a user may share with his mother a permission to turn on/off a smart TV, such that his mother can have a permission to control turning on/off the smart TV. Moreover, the owner of the device may also be able to remove a limited control relationship between an account and the device, to withdraw a family member's permission to control one or more aspects of the device.

Various defects may exist in the related art. For example, after a permission to control an aspect of a device is shared with other accounts, to withdraw the permission to control the aspect of the device from each share account, the owner of the device may have to manually remove each of the limited control relationships one-by-one from each respective share account. If the owner forgets that he has shared the permission to control the aspect of the device, after the full control relationship between the owner and the device is removed, the share account users might still retain permissions to control the aspect of the device, which may pose risks to security.

SUMMARY

Technical solutions are provided herein to the problem that if the owner forgets that he has previously shared the permission to control one or more aspects of a device, after the full control relationship between the owner and the device is removed, the share user might still retain the permission to control the one or more aspects of the device. The present disclosure provides methods and devices for removing a control relationship.

According to a first aspect of embodiments of the present disclosure, there is provided a method for removing a control relationship, which is applied in a server. A method may include receiving, by the server, a removal request from a first user account, the removal request configured to request removal of a control relationship between the first user account and a device. The method may further include determining, by the server, whether the first user account is an owner account of the device or a share account of the device. The method may further include, when the first user account is determined to be an owner account of the device, retrieving, by the server, a first share account corresponding to the device, the first share account being an account having permission to control the device, wherein the permission to control the device has been shared with the first share account by a user account different from the first share account. The method may further include when the first user account is determined to be an owner account of the device, removing, by the server, a full control relationship between the owner account and the device. The method may further include when the first user account is determined to be an owner account of the device, removing, by the server, a limited control relationship between the first share account and the device.

A method may further include, when the user account is determined to be a share account of the device, removing a limited control relationship between the device and the user account.

A method may further include, prior to receiving the removal request from the first user account, receiving a first sharing offer from the owner account to the first share account. A method may further include, prior to receiving the removal request from the first user account, forwarding the received first sharing offer to the first share account. A method may further include, prior to receiving the removal request from the first user account, in response to receipt from the first share account of an accepting message configured to accept the first sharing offer, establishing the limited control relationship between the first share account and the device.

A method may further include, prior to receiving the removal request from the first user account, receiving a second sharing offer from the first share account to a second share account. A method may further include, prior to receiving the removal request from the first user account, forwarding the received second sharing offer to the second share account. A method may further include, prior to receiving the removal request from the first user account, in response to receipt from the second share account of an accepting message configured to accept the second sharing offer, establishing a limited control relationship between the second share account and the device.

A method may further include, prior to receiving the removal request from the first user account, sending a notification message to the owner account, the notification message configured to indicate that the second share account has established a limited control relationship with the device through permission to control the device shared with the second share account by the first share account.

According to a second aspect of embodiments of the present disclosure, there is provided a device for removing a control relationship. A device may include a processor and a memory for storing instructions executable by the processor. The processor may be configured to receive a removal request from a first user account, the removal request being configured to request removal of a control relationship between the first user account and a device. The processor may be further configured to determine whether the first user account is an owner account of the device or a share account of the device. The processor may be further configured to, when the first user account is determined to be an owner account of the device, retrieve a first share account corresponding to the device, the first share account being an account having a permission to control the device, wherein the permission to control the device has been shared with the first share account by a user account different from the first share account. The processor may be further configured to, when the first user account is determined to be an owner account of the device, remove a full control relationship between the owner account and the device. The processor may be further configured to, when the first user account is determined to be an owner account of the device, remove a limited control relationship between first share account and the device.

The processor may be further configured to, when the first user account is determined to be a share account of the device, remove a limited control relationship between the first user account and the device.

The processor may be further configured to receive a first sharing offer from an owner account to a first share account. The processor may be further configured to forward the received first sharing offer to a first share account. The processor may be further configured to, in response to receipt from the first share account of an accepting message configured to accept the first sharing offer, establish a limited control relationship between the first share account and the device.

The processor may be further configured to receive a second sharing offer from the first share account to a second share account. The processor may be further configured to forward the received second sharing offer to the second share account. The processor may be further configured to, in response to receipt from the second share account of an accepting message configured to accept the second sharing offer, establish a limited control relationship between the second share account and the device.

The processor may be further configured to send a notification message to the owner account, the notification message configured to indicate that the second share account has established a limited control relationship with the device through permission to control the device shared with the second share account by the first share account.

According to a third aspect of the embodiment of the present disclosure, there is provided a non-transitory computer-readable storage medium having stored therein instructions for terminating a control relationship. The instructions may be configured to, when executed by a processor of the server, cause the server to receive a removal request from a first user account, the removal request being configured to request removal of a control relationship between the first user account and a device. The instructions may be further configured to, when executed by a processor of the server, cause the server to determine whether the first user account is an owner account of the device or a share account of the device. The instructions may be further configured to, when executed by a processor of the server, cause the server to, when the first user account is determined to be an owner account of the device, retrieve a first share account corresponding to the device, the first share account being an account having a permission to control the device, wherein the permission to control the device has been shared with the first share account by a user account different from the first share account. The instructions may be further configured to, when executed by a processor of the server, cause the server to, when the first user account is determined to be an owner account of the device, remove a full control relationship between the owner account and the device. The instructions may be further configured to, when executed by a processor of the server, cause the server to, when the first user account is determined to be an owner account of the device, remove a limited control relationship between first share account and the device.

Technical solutions according to embodiments of the present disclosure may have the following beneficial effects. A removal request from an owner account of the device is received. At least one share account corresponding to the device is retrieved. A control relationship between the device and the owner account is removed, and a control relationship between the device and the share account is removed. Embodiments of the disclosure may thereby solve the problem in the related art that if the owner forgets that he has already shared the permission to control aspects of the device, after the full control relationship between the owner and the device is removed, the share user might still retain the permission to control aspects of the device. Embodiments of the disclosure may provide that when the full control relationship between the owner account of the device and the device is removed, the limited control relationship between the share account of the device and the device can be automatically and simultaneously removed, such that the security of the device may be improved.

It is to be understood that both the foregoing general description and the following detailed description are exemplary only and are not restrictive of the claims.

BRIEF DESCRIPTION OF THE DRAWINGS

The accompanying drawings, which are incorporated in and constitute a part of this specification, illustrate embodiments consistent with the disclosure and, together with the description, serve to explain principles of the disclosure.

DETAILED DESCRIPTION

Reference will now be made in detail to exemplary embodiments, examples of which are illustrated in the accompanying drawings. The following description refers to the accompanying drawings, in which the same numbers in different drawings represent the same or similar elements unless otherwise noted. Implementations set forth in the following description of exemplary embodiments do not represent all implementations consistent with the disclosure. Instead, they are merely examples of devices and methods consistent with aspects related to the disclosure and the appended claims.

Figure 1:
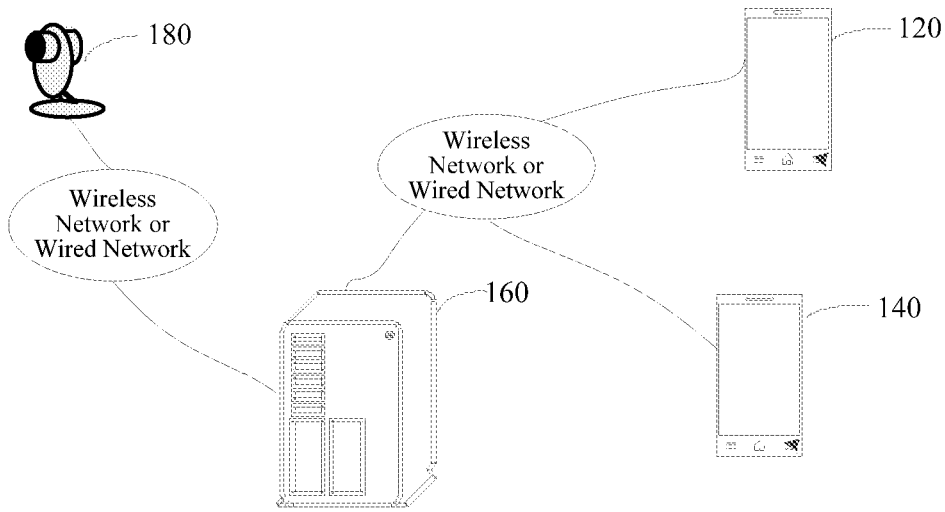
FIG. 1 is a schematic diagram illustrating an implementation environment involved in embodiments of the present disclosure.

FIG. 1 is a schematic diagram illustrating an implementation environment involved in embodiments of the present disclosure. The implementation environment may include: a first terminal 120, a second terminal 140, a server 160, and a device 180.

The first terminal 120 and the second terminal 140 may be terminal devices such as a mobile phone, a tablet computer, a portable computer, a desktop computer, and the like. A user may log in to a user account through a terminal. The user account is a user account of a client terminal which has the ability to manage functions of a device.

A user account may be logged into through various terminals, and various user accounts may be logged into through one terminal. The present disclosure is not limited to these exemplary embodiments. In exemplary embodiments of the present disclosure, one user account corresponds to one terminal.

The first terminal 120 or the second terminal 140 may be connected to the server 160 through a wireless network such as a Wireless-Fidelity (Wi-Fi), BLUETOOTH, or wired network.

The server 160 may be a single server, a server cluster composed of several servers, or a cloud calculation server center. The server 160 is configured to provide background service for the client terminals which have the ability to manage functions of a device.

The device 180 may be a device of various kinds of devices related to smart homes, and may for example include: a smart camera, a smart TV, a smart air conditioner, a smart air purifier, and other electrical devices.

The device 180 may establish a communication connection with the server 160 through a wireless or wired network.

In a method for removing a control relationship provided by the embodiments of the present disclosure, other terminals in addition to the first terminal 120 and the second terminal 140 may be included. The present disclosure is not limited to these exemplary embodiments.

Figure 2:
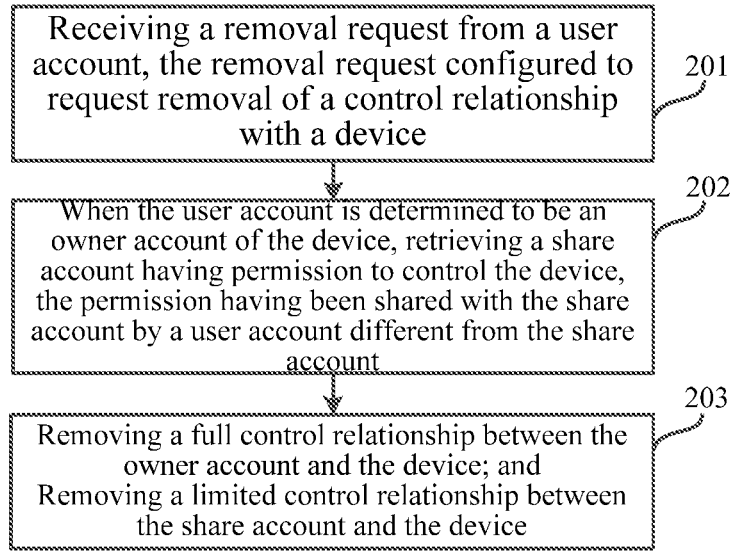
FIG. 2 is a flow chart illustrating a method for removing a control relationship according to an exemplary embodiment.

FIG. 2 is a flow chart illustrating a method for removing a control relationship according to an exemplary embodiment. In a present embodiment, a method for removing a control relationship may be applied in the server 160 as shown in FIG. 1, for example. A method may include the following steps.

In step 201, a removal request from a user account is received, the removal request configured to request removal of a control relationship with a device.

Generally, a control relationship may operatively relate or connect a device to one or more user accounts that are permitted to control that device, and also operatively relate or connect a user account to one or more devices that user account is permitted to control. An established control relationship may allow a user account to remotely control aspects of a device. For example, a full control relationship may be established between a device and an owner account of the device, such that the owner account of the device is assigned permissions to control all controllable aspects corresponding to that device. In addition, a limited control relationship may be established between the device and a share account of the device, such that the share account is assigned permissions to control less than all of the controllable aspects corresponding to the device. The term "control of a device" may encompass the term "control of aspects of a device" herein. For example, a permission to control a device may encompass a permission to control an aspect of a device, and may encompass permissions to control one or more aspects of a device.

Thus the term "control relationship" can refer to: a full control relationship and/or a limited control relationship.

In step 202, when the user account is determined to be an owner account of the device, a share account corresponding to the device is retrieved, the retrieved share account being an account having a permission to control one or more aspects of the device, wherein the permission to control one or more aspects of the device has been shared with the share account by a user account different from the share account.

In step 203, a full control relationship between the device and the owner account is removed, and a limited control relationship between the device and the share account is removed.

Accordingly, in methods for removing a control relationship provided by embodiments of the present disclosure: A removal request from an owner account of the device is received. At least one share account corresponding to the device is retrieved. A control relationship between the device and the owner account is removed. A control relationship between the device and the share account is removed. Embodiments of a method may thereby solve a problem in the related art: the possibility that if the owner forgets that he has previously shared permission to control one or more aspects of the device, after the full control relationship between the owner and the device is removed, the share user might still retain permission to control to one or more aspects of the device. Embodiments of a method may provide that when the full control relationship between the owner account of the device and the device is removed, the limited control relationship between the share account of the device and the device can be simultaneously and automatically removed, and security of the device may be improved.

In an embodiment of the present disclosure: A user logs in to a user account through a terminal, and a control relationship is established between the user account and the device. Each user account having a control relationship with the device has an assigned identity, which may be an owner account or a share account. Generally, each device has only one related owner account, and may have more than one related share account. A first user account to connect to the device may automatically establish a full control relationship with the device, such that the identity of the user account is assigned to be the owner account. Other user accounts may establish limited control relationships with the device by accepting an offer to share control of the device, e.g. a sharing offer, such that the identities of those user accounts are assigned to be share accounts. The user account assigned to be the owner account is assigned all permissions to control all controllable aspects corresponding to the device, and a user account assigned to be a share account is assigned permissions to control less than all of the controllable aspects corresponding to the device. Exemplary permissions to control aspects of a device may include: a permission to control turning on the device, a permission to control turning off the device, a permission to control setting of operation parameters of the device, and other permissions. The present disclosure is not limited to these exemplary embodiments.

In an embodiment of the present disclosure, a method is described with reference to the implementation environment of the first terminal 120 and the second terminal 140 as shown in FIG. 1. In an exemplary embodiment, it may be assumed, for example, that the user has logged in to a user account through the first terminal 120, and has established a control relationship with the device 180. Because in this example the user account on the first terminal 120 is the first user account to have established a control relationship with the device 180, the identity of the user account on the first terminal 120 is assigned to be the owner account, and a full control relationship between the owner account and the device 180 is established. The user account on second terminal 140 can establish a control relationship with the device 180 by accepting a sharing offer of control of one or more controllable aspects of the device, and thereby have the identity of the user on the second terminal 140 be assigned to be a share account, and be assigned permissions to control less than all of the one or more controllable aspects corresponding the device 180.

Figure 3A:
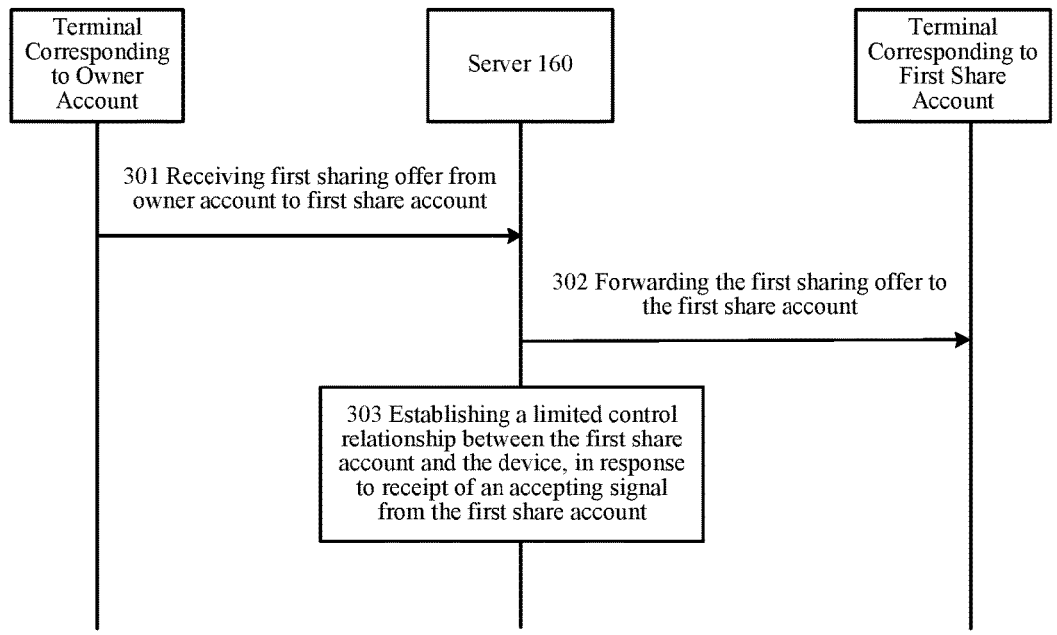
FIG. 3A is a flow chart illustrating a method for establishing a control relationship according to an exemplary embodiment.

FIG. 3A is a flow chart illustrating a method for establishing a control relationship according to an exemplary embodiment. In a present embodiment, a method may be applied in the implementation environment as shown FIG. 1, for example. A method may include the following steps.

In step 301, a first sharing offer from the owner account to a first share account is received.

The server receives the first sharing offer from the owner account to the first share account. A first share account is a user account that receives data shared by an owner account acting as a source party.

When the user corresponding to the owner account of the device wants to share the permission to control aspects of the device with other users, the owner account may send a first sharing offer to the server. A first sharing offer carries at least a device identification and a first share account identification.

The device identification may be an Internet Protocol (IP) address of the device, a Media Access Control (MAC) address of the device, and the like.

The first share account identification may be a mobile phone number of the offered share user, an instant communication account of the offered share user, such as a QQ Messenger number, a MiTalk number, or the like. The disclosure is not limited to these exemplary embodiments.

In step 302, the first sharing offer is forwarded to the first share account.

After the server receives the first sharing offer from the owner account, the server forwards the first sharing offer to the first share account with the first share account identification carried in the first sharing offer.

In step 303, when an accepting message from the first share account and configured to accept the first sharing offer is received, a limited control relationship between the first share account and the device is established.

After the first share account receives the above first sharing offer and selects accepting the sharing offer, the first share account sends to the server an accepting message configured to accept the first sharing offer.

In a present embodiment, each respective user account corresponds to a respective device list, and after a user logs in to a user account through a terminal the user may check the respective device list corresponding to that user account through the terminal. The respective device list is configured to record information about all devices having control relationships with the respective user account, the recorded information including, but not limited to, names of the devices, identifications of the devices, and sharing flags of the devices.

A sharing flag may be displayed when the user account is a share account of the device, and may be used for indicating that the identity of the respective user account is assigned to be a share account. The specific implementation of the sharing flag may be the words "share account" or other flags. The disclosure is not limited to these exemplary embodiments.

The following Table 1 is an exemplary form of a device list, and schematically illustrates the device list of exemplary user account 1. In this example, device 1, device 2, and device 3 each have a control relationship with the user account 1. Each row of the device list records information corresponding to one respective device. For example, in Table 1, the first row records a name 1 of the device 1, a device identification 1 of the device 1, and a sharing flag of the device 1. The second row and the third row record information respectively corresponding to the device 2 and the device 3, and so on.

Exemplary names of the devices may be a "smart camera," a "smart TV," a "smart air conditioner," and the like, as mentioned above, for the user to distinguish the different devices. The sharing flags indicate whether the user account 1 is a respective share account of each of the devices. For example, in Table 1, the sharing flags respectively corresponding to the device 1 and the device 3 indicate share accounts, while the sharing flag corresponding to the device 2 is blank. This configuration may indicate that the user account 1 is a respective share account of the device 1 and the device 3, and is the owner account of the device 2.

The format and the contents of the device list as shown in Table 1 are exemplary. The disclosure is not limited to these exemplary embodiments.

TABLE 1

| User Account | Name of Device | Device Identification | Sharing Flag |
|---|---|---|---|
| User Account 1 | Name 1 | Device Identification 1 | Share Account |
| | Name 2 | Device Identification 2 | |
| | Name 3 | Device Identification 3 | Share Account |
| ... | ... | ... | ... |

In a present embodiment, each device also corresponds to a device permission table, for recording relationships between each user account having a control relationship with the device and that respective device. By querying the device permission table, the server may retrieve all user accounts having a control relationship with the respective device, and may retrieve each respective identity and permissions to control aspects of each respective device.

An identity of a user account may be assigned to be an owner account or a share account.

The following Table 2 is an exemplary form of the device permission table. It is a device permission table corresponding to the exemplary device 1 with the device identification 1. In this exemplary embodiment, the user account 1, the user account 2, and the user account 3 each have a respective control relationship with the device 1. Each row of the device permission table records for each user account a respective identity and permission to control that device. For example, in Table 2, the first row records the user account 1, that the identity of the user account 1 is the owner account, and that the owner account has all permissions to control all aspects of device 1. The second row records the user account 2, that the identity of the user account 2 is a share account, and that this share account has permission to control aspect 1 and permission to control aspect 2. The third row records the user account 3, that the identity of the user account 3 is a share account, and that this share account has permission to control aspect 1, and so on.

In Table 2, the user account 1 is identified as the owner account of device 1, and the user account 2 and the user account 3 are each identified as respective share accounts of device 1. In one embodiment, a column corresponding to the identities of the user accounts can identify only a single owner account, and more than one share accounts.

The format and the contents of the device permission table as shown in Table Two are exemplary. The disclosure is not limited to these exemplary embodiments.

TABLE 2

| Device Identification | User Account | Identity and Permissions to Control |
|---|---|---|
| Device Identification 1 | User Account 1 | Owner Account (All Permissions to Control all Aspects) |
| | User Account 2 | Share Account (Permission to Control Aspect 1, Permission to Control Aspect 2) |
| | User Account 3 | Share Account (Permission to Control Aspect 1) |
| | . . . | . . . |

After the server receives the accepting message returned by the first share account, the server adds information about the shared device to the device list corresponding to the first share account. The server also adds the first share account to the device permission table of the device that corresponds to the device identification carried in the first sharing offer, and records the identity of the user account as being a share account. Thus, a limited control relationship between the first share account and the device is established.

Optionally, after the limited control relationship between the first share account and the device is established, the server may send a notification message to the owner account, to inform the owner account that the limited control relationship between the first share account and the device has been properly established Optionally, when the first share account receives the first sharing offer, the first share account may instead return to the server a first rejecting message configured to reject the first sharing offer. Then the server returns the first rejecting message to the owner account and does not establish the limited control relationship between the device and the first share account.

Optionally, the first sharing offer from the owner account to the first share account may also include information about one or more permissions to control one or more aspects of the device. The information about one or more permissions to control one or more aspects of the device may include: a permission to control turning on the device, a permission to control turning off the device, a permission to control setting operation parameters of the device, and other permissions. The information about permissions to control aspects of the device is used for defining which permissions to control aspects of the device may be assigned to the first share account. The owner account may send different information about permissions to control aspects of the device to different respective first share accounts.

Methods provided by above embodiments and referencing first share accounts are merely exemplary. Whenever the owner account shares a permission to control aspects of the device with any other user accounts, the above methods of the owner account sending a sharing offer to the first share account may be applied.

An embodiment of the present disclosure also provides a re-sharing aspect. The information about permission to control aspects of the device, which is carried in the first sharing offer, may also include a re-sharing permission, configured to assign to the first share account a re-sharing permission. A re-sharing permission indicates that the first share account can re-share with other user accounts its assigned permission to control aspects of the device. When the first sharing offer does not contain a re-sharing permission, the first share account cannot further share its assigned permission to control aspects of the device with other user accounts. When the first sharing offer contains a re-sharing permission, the first share account can further share with other user accounts all permissions to control aspects of the device assigned to the first share account.

Figure 3B:
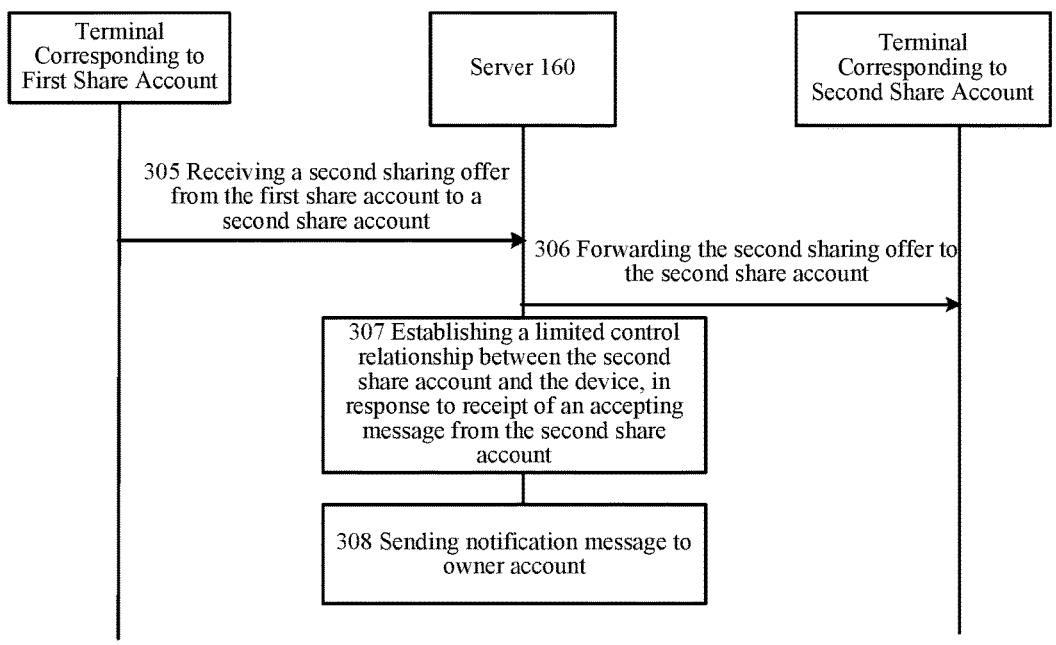
FIG. 3B is a flow chart illustrating a method for establishing a control relationship according to an exemplary embodiment.

FIG. 3B is a flow chart illustrating a method for establishing a control relationship according to another exemplary embodiment. As shown in FIG. 3B, a method may include the following steps.

In step 305, a second sharing offer from the first share account to a second share account is received.

The server receives the second sharing offer from the first share account to the second share account. The second share account herein refers to a user account which receives data re-shared by the first share account. Here the modifier "second" is merely exemplary, and merely for distinguishing from the first share account. The second share account may be any share account. The disclosure is not limited to these exemplary embodiments.

When a user corresponding to the first share account of the device wants to share permission to control aspects of the device with other users, the first share account sends a second sharing offer to the server, the above second sharing offer carrying at least a device identification and a second share account identification. The device identification may be an IP address of the device, a MAC address of the device, and the like. The second share account may be a mobile phone number of the share user, an instant communication account of the share user, such as a QQ Messenger number, a MiTalk number, or the like. The disclosure is not limited to these exemplary embodiments.

In step 306, the second sharing offer is forwarded to the second share account.

After the server receives the second sharing offer from the first share account, the server forwards the second sharing offer to the second share account, whose identification is carried in the second sharing offer.

In step 307, when an accepting message from the second share account and configured to accept the second sharing offer is received, a limited control relationship between the second share account and the device is established.

After the second share account receives the above second sharing offer and selects accepting the sharing offer, the second share account sends to the server an accepting message configured to accept the second sharing offer.

After the server receives the accepting message returned by the second share account, the server adds information about the shared device to the device list respectively corresponding to the second share account. The server also adds the second share account to the device permission table of the device corresponding to the device identification carried in the above second sharing offer, and records the identity of the user account as being a share account. Thus, a limited control relationship between the second share account and the device is established. After the second share account accepts the sharing offer from the first share account, the second share account is assigned the same permissions to control aspects of the device as are assigned to the first share account.

In step 308, a notification message is sent to the owner account.

After a limited control relationship is established between the second share account and the device, the server sends a notification message to the owner account, configured to inform the owner account that a limited control relationship is properly established between the second share account and the device.

Optionally, the second sharing offer from the first share account to the second share account may also include information about a re-sharing permission, such that the second share account could itself share permission to control aspects of the device with other user accounts.

Optionally, when the second share account receives the above second sharing offer, the second share account may instead return the server a second rejecting message configured to reject the second sharing offer. Then the server returns the second rejecting message to the first share account and does not establish a limited control relationship between the device and the second share account.

Those skilled in the art will understand that the methods provided by above embodiments, and references to first and second share accounts, are merely exemplary. Whenever any share account which has re-sharing permission shares permission to control aspects of the device with other user accounts, the above method for the first share account sending a sharing offer to the second share account may be applied.

Figure 3C:
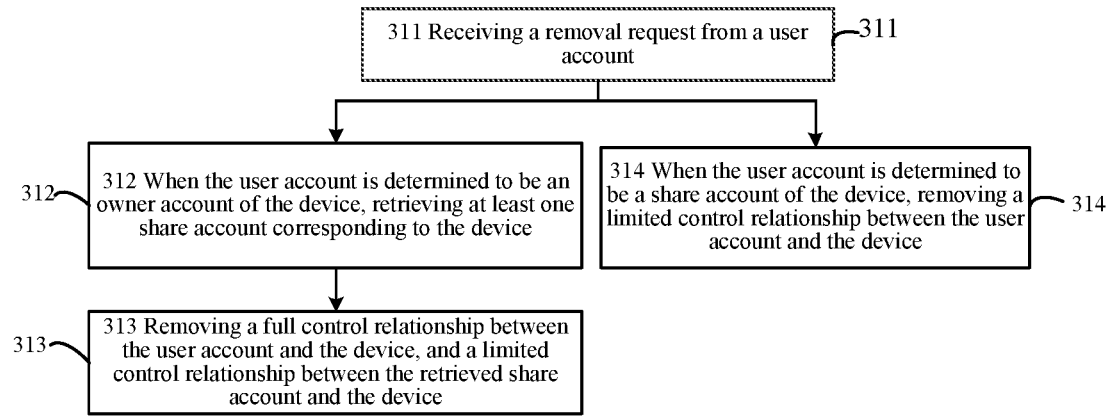
FIG. 3C is a flow chart illustrating a method for removing a control relationship according to an exemplary embodiment.

FIG. 3C shows a flow chart of a method of removing control relationships when the owner account and a share account have established control relationships with the device. The control relationships removed in a method of FIG. 3C may have, for example, been established by one or more of the methods of establishing control relationships discussed above in reference to FIG. 3A or FIG. 3B.

In step 311, a removal request from a user account is received.

The server receives a removal request from a user account. The removal request may be configured to request removal of a control relationship between the user account and the device. When a user wants to remove a control relationship with the device, the user may log in to a user account through a terminal, and send a removal request configured to remove the control relationship. The removal request contains at least a user account identification of the user account which intends to remove the control relationship, and a device identification of a device the control relationship with which is to be removed. The device identification may be a MAC address or an IP address of the device. The disclosure is not limited to these exemplary embodiments.

The user account sends the removal request to the server through the terminal. The removal request may be configured to instruct the server to remove a control relationship between the user account and the device when the server determines that the user account is recorded as having a control relationship with the device.

Then, as shown in FIG. 3C, depending on the identity of the user account carried in the received removal request, the server may perform one of the following responding manners.

First Responding Manner

In step 312, when the user account is determined to be an owner account of the device, at least one share account corresponding to the device is retrieved.

After the server receives the removal request from the user account, the server queries the device permission table of the device corresponding to the device identification carried in the removal request. When the query finds that the device permission table records the user account carried in the removal request, the server determines that the user account has established a control relationship with the device, and reads from the device permission table an identity assigned to the above user account. When the server reads from the device permission table that the identity of the above user account is the owner account of the device, the server queries the device permission table to retrieve all user accounts identified as share accounts that are recorded in the device permission table as having permissions to control one or more aspects of the device.

In step 313, a full control relationship between the device and the owner account is removed, and a limited control relationship between the device and the retrieved share account of the device is removed.

After the server receives the removal request from the owner account and retrieves all share accounts of the device, the server retrieves respective device lists for the owner account and for each of the share accounts, and deletes information about the removed device from the respective device lists of each of the user accounts that are identified as the owner account of the device or as a share account of the device. Additionally, the server retrieves the device permission table of the device based on the device identification carried in the removal request, and deletes from the device permission table information about the user account that is identified as the owner account and information about all of the user accounts that are identified as share accounts of the device. Thus, the full control relationship between the device and the user account identified as the owner account is removed, and the limited control relationships between the device and each of the user accounts identified as share accounts of the device are removed. Removal of the limited control relationships that are associated with a respective full control relationship may be automatically removed upon the removal of the full control relationship.

Second Responding Manner

In step 314, when the user account is determined to be a share account of the device, a limited control relationship between the device and the user account is removed.

After the server receives the removal request from the user account, the server queries the device permission table of the device corresponding to the device identification carried in the removal request. When the device permission table records the user account whose identification is carried in the removal request, the server determines that the user account has established a control relationship with the device, and reads from the device permission table an identity assigned to the user account. When the server reads from the device permission table that the identity of the user account is a share account of the device, the server retrieves the device list of the user account that is identified as a share account, and deletes information about the device from the device list of the user account identified as a share account. For example, the server retrieves the device permission table of the device based on the device identification carried in the removal request, and deletes from the device permission table information corresponding to the user account that is identified as a share account.

In one possible implementation, the removal request configured to request removal of the share account may be from the share account. When the user of a share account wants to remove the limited control relationship with the device, the share account may send a removal request, the removal request carrying at least the user account identification of the share account requesting removal, and the device identification of the device the limited control relationship with which is being requested to be removed.

In another possible implementation, the removal request configured to request removal of the share account may be from the owner account. When the owner account does not wish to allow the share account to continue to have permission to control aspects of the device, the owner account may send the removal request to the server, the removal request carrying at least the user account identification of the share account the removal of whose limited control relationship is being requested, and the device identification of the device the limited control relationship with which is being requested to be removed.

In methods provided by a present embodiment, a removal request from the owner account is received. At least one share account corresponding to the device is retrieved. A control relationship between the device and the owner account and a control relationship between the device and the share account are removed. Such an embodiment may solve a problem in the related art that if the owner forgets that he has previously shared permission to control aspects of a device, after the full control relationship between the owner and the device is removed, the share user might still retain the permission to control to the device. Such an embodiment may provide that when the full control relationship between the device and the owner account of the device is removed, the limited control relationship between the device and the share account of the device can be simultaneously and automatically removed, and the security of the device may be improved.

In methods provided by a present embodiment, the owner account may send a sharing offer to other user accounts, such that a limited control relationship can be established between the device and a share account, such that the share account can be assigned less than all of the permissions to control aspects of the device. Such an embodiment may allow both the owner account and the share account to control the device remotely while ensuring that the owner account has the dominant permission to control the device.

In methods provided by a present embodiment, a share account can re-share the permissions which are assigned to it. The share account may thereby further send re-sharing offers to other user accounts. This feature may broaden the permission sharing range, and improve the utilization and operation convenience of the device.

Figure 4:
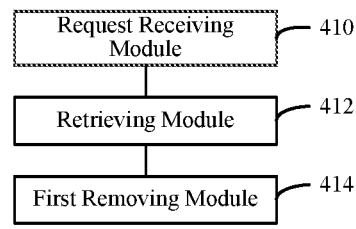
FIG. 4 is a block diagram of a device for removing a control relationship according to an exemplary embodiment.

Device embodiments of the present disclosure are described as follows, which may be configured to perform the method embodiments of the present disclosure. Details not explicitly discussed in connection with the device embodiments of the present disclosure may be implemented with reference to the method embodiments of the present disclosure FIG. 4 is a block diagram of a device for removing a control relationship according to an exemplary embodiment. As shown in FIG. 4, a device may be applied in the implementation environment as shown in FIG. 1. A device may include, but is not limited to: a request receiving module 410, a retrieving module 412 and a first removing module 414.

The request receiving module 410 is configured to receive a removal request from a user account, the removal request configured to remove a control relationship between the user account and a device.

The retrieving module 412 is configured to determine whether the first user account is an owner account of the device or a share account of the device, and when the first user account is determined to be an owner account of the device, retrieve a first share account corresponding to the device, the first share account being an account having a permission to control of the device, wherein the permission to control has been shared with the first share account by a user account different from the first share account.

The first removing module 414 is configured to remove a full control relationship between the owner account and the device, and remove a limited control relationship between the first share account and the device.

In a device for removing a control relationship provided by an embodiment of the present disclosure, a removal request from an owner account of the device is received. At least one share account corresponding to the device is retrieved. A control relationship between the device and the owner account, and a control relationship between the device and the share account are removed. An embodiment of a device may thereby solve a problem in the related art that if the owner forgets that he has already shared permission to control aspects of the device, after the full control relationship between the owner and the device is removed, the share user might still retain the permission to control aspects of the device. An embodiment of a device may provide that when the full control relationship between the owner account of the device and the device is removed, the limited control relationship between the share account of the device and the device can be automatically and simultaneously removed, so that the security of the device may be improved.

Figure 5A:
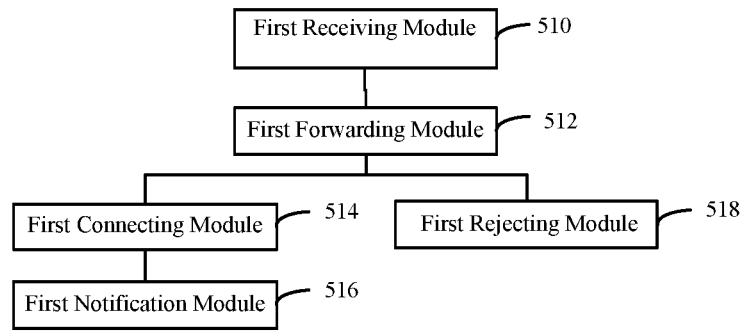
FIG. 5A is a block diagram of a device for establishing a control relationship according to an exemplary embodiment.

FIG. 5A is a block diagram of a device for establishing a control relationship according to another exemplary embodiment. The device may include: a first receiving module 510, a first forwarding module 512, and a first connecting module 514.

The first receiving module 510 is configured to receive a first sharing offer from an owner account to a first share account.

The first forwarding module 512 is configured to forward the received first sharing offer to a first share account. After the first receiving module 510 receives the first sharing request from the owner account, the first forwarding module 512 forwards the first sharing request to the first share account carried in the first sharing request.

The first connecting module 514 is configured to, in response to receipt from the first share account of an accepting message configured to accept the first sharing offer, establish a limited control relationship between the first share account and the device.

Optionally, the device of FIG. 5A may further include a first notification module 516, configured to, after the limited control relationship between the first share account and the device is established, send a notification message to the owner account, the notification message configured to indicate that the second share account has established a limited control relationship with the device through permission to control the device shared with the second share account by the first share account.

Optionally, the above device may further include: a first rejecting module 518, configured to return a first rejecting message to the owner account. When the first share account receives the above first sharing offer, the first share account may also select to reject the first sharing offer. In this case, the first rejecting module 518 returns the first rejecting message to the owner account and the first connecting module 514 will not establish a limited control relationship between the device and the first share account.

Optionally, the first sharing request received by receiving module 510 from the owner account may also include data about permission to control one or more aspects of a device. Data about permission to control one or more aspects of a device may include: a permission to control turning on the device, a permission to control turning off the device, a permission to control setting operation parameters of the device, and other permissions. Data about a first permission to control aspects of a device may be configured to define which permissions to control aspects of the device can be assigned to the first share account. The owner account may send different data about first permissions to control aspects of the device to different first share accounts.

It should be understood by those skilled in the art that, the device provided by the above embodiments, and referencing a first share account, is merely illustrative. Whenever the owner account shares a permission to control aspects of the device with any other user accounts, the relevant modules of the device used to implement the owner account sending a request to the first share account may be applied.

An embodiment of a device of the present disclosure also provides a re-sharing module. The information about permission to control aspects of the device, which is carried in the first sharing request, may also include a re-sharing permission, configured to assign to the first share account a re-sharing permission. A re-sharing permission indicates that the first share account can re-share with other user accounts its assigned permission to control aspects of the device. When the first sharing offer does not contain a re-sharing permission, the first share account cannot further share its assigned permission to control aspects of the device with other user accounts. When the first sharing offer contains a re-sharing permission, the first share account can further share with other user accounts all permissions to control aspects of the device assigned to the first share account.

Figure 5B:
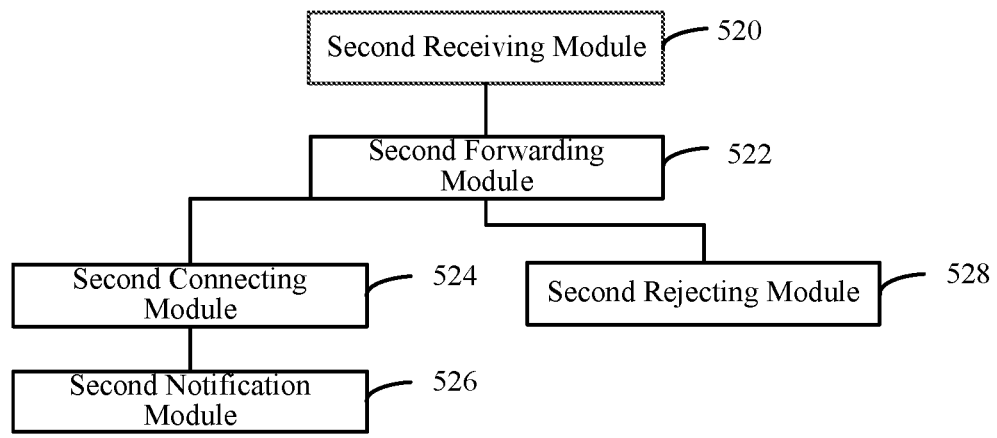
FIG. 5B is a block diagram of a device for establishing a control relationship according to an exemplary embodiment.

FIG. 5B is a block diagram of a device for establishing a control relationship according to another exemplary embodiment. A device may include: a second receiving module 520, a second forwarding module 522, a second connecting module 524 and a second notification module 526.

The second receiving module 520 is configured to receive a second sharing offer from the first share account to a second share account.

The second forwarding module 522 is configured to forward the received second sharing offer to the second share account. After the second receiving module 522 receives the second sharing offer from the first share account, the second forwarding module 522 forwards the second sharing offer to the second share account carried in the second sharing request.

The second connecting module 524 is configured to, in response to receipt from the second share account of an accepting message configured to accept the second sharing offer, establish a limited control relationship between the second share account and the device.

The second notification module 526 is configured to send a notification message to the owner account. After a limited control relationship between the second share account and the device is established, the server sends a notification message to the owner account, the notification message configured to indicate that the second share account has established a limited control relationship with the device through permission to control the device shared with the second share account by the first share account.

Optionally, the second sharing offer received by the second receiving module 520 may also include information about a re-sharing permission.

Optionally, an above device of FIG. 5B may further include: a second rejecting module 528, configured to return a second rejecting message to the first share account. When the second share account receives a second sharing offer, the second share account may also select to reject the second sharing account. In this case, the second rejecting module 528 returns the second rejecting message to the first share account and the second connecting module 524 will not establish a limited control relationship between the device and the second share account.

It should be understood by those skilled in the art that the devices provided by the above embodiments and referencing first and second share accounts are merely illustrative. Whenever any share account which has re-sharing permission shares permission to control aspects of the device with other user accounts, above modules for implementing the first share account sending a request to the second share account may be applied to implement a similar method for those other user accounts.

Figure 5C:
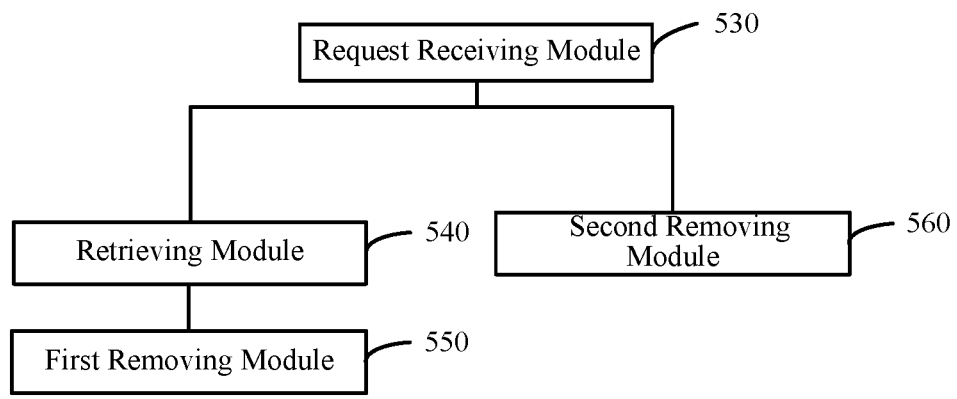
FIG. 5C is a block diagram of a device for removing a control relationship according to an exemplary embodiment.

FIG. 5C is a block diagram of a device for removing a control relationship according to another exemplary embodiment. A previously established control relationship may be removed as shown in the block diagram of FIG. 5C when both of an owner account and a share account have a control relationship with the device. A device may include: a request receiving module 530, a retrieving module 540, a first removing module 550 and a second removing module 560.

The request receiving module 530 is configured to receive a removal request from a first user account, the removal request being configured to remove a control relationship between the first user account and a device.

At this time, as can be seen from FIG. 5C, the processing branches. Depending on the respective identities of user accounts carried in the received removal request, the device may respond in one of the following manners.

To implement a first responding manner the retrieving module 540 is configured to determine whether the first user account is an owner account of the device or a share account of the device, and when the first user account is determined to be an owner account of the device, retrieve a first share account corresponding to the device, the first share account being an account having a permission to control of the device, wherein the permission to control has been shared with the first share account by a user account different from the first share account. The first removing module 550 is configured to remove a full control relationship between the owner account and the device. The first removing module 550 is further configured to remove a limited control relationship between first share account and the device.

To implement the second responding manner the second removing module 560 is configured to determine whether the first user account is an owner account of the device or a share account of the device, and when the user account is determined to be a share account of the device, remove a limited control relationship between the device and the user account.

In one possible implementation, the removal request of a limited control relationship of the share account may be received from the share account. When the share account intends to remove the limited control relationship with the device, the share account may send to request receiving module 530 a removal request, the removal request carrying at least the user account identification of the share account requesting removal, and the device identification of the device the limited control relationship with which is being requested to be removed.

In another possible implementation, the removal request of a limited control relationship of the share account may be received from the owner account. When the owner account does not wish to continue to permit control of aspects of the device by the share account, the owner account may send the removal request to the request receiving module 530, the removal request carrying at least the user account identification of the share account whose limited control relationship is being requested to be removed, and the device identification of the device the limited control relationship with which is being requested to be removed.

In a device provided by the present embodiment, a removal request from the owner account is received. At least one share account corresponding to the device is retrieved. A control relationship between the device and the owner account is removed, and a control relationship between the device and the share account is removed. An embodiment of a device may thereby solve the problem in the related art that if the owner forgets that he has previously shared the permission to control an aspect of the device, after the full control relationship between the owner and the device is removed, the share user might still retain the permission to control the aspect of the device. An embodiment of a device may provide that when the full control relationship between the owner account of the device and the device is removed, the limited control relationship between the share account of the device and the device can be automatically and simultaneously removed, and the security of the device may be improved.

In a device provided by a present embodiment, the owner account may send a sharing offer to other user accounts, such that a limited control relationship can be established between a device and a user account offered to be identified as a share account of the device, and the user account identified as a share account of the device can be assigned less than all of the permissions to control aspects of the device. An embodiment of a device may thereby allow both the owner account and the share account to control the device remotely, while ensuring that the owner account has the dominant permission to control the device.

In a device provided by a present embodiment, a share account can re-share the permissions to control aspects of the device that it has been assigned. An embodiment of a device thus provides that the share account may further send a re-sharing request to other user accounts, which may broaden the permission sharing range, and improve the utilization and operation convenience of the device.

With respect to the devices in above embodiments, specific manners for performing operations for individual modules therein have been described in detail in the embodiments regarding the relevant methods, and will not be repeated herein.

Figure 6:
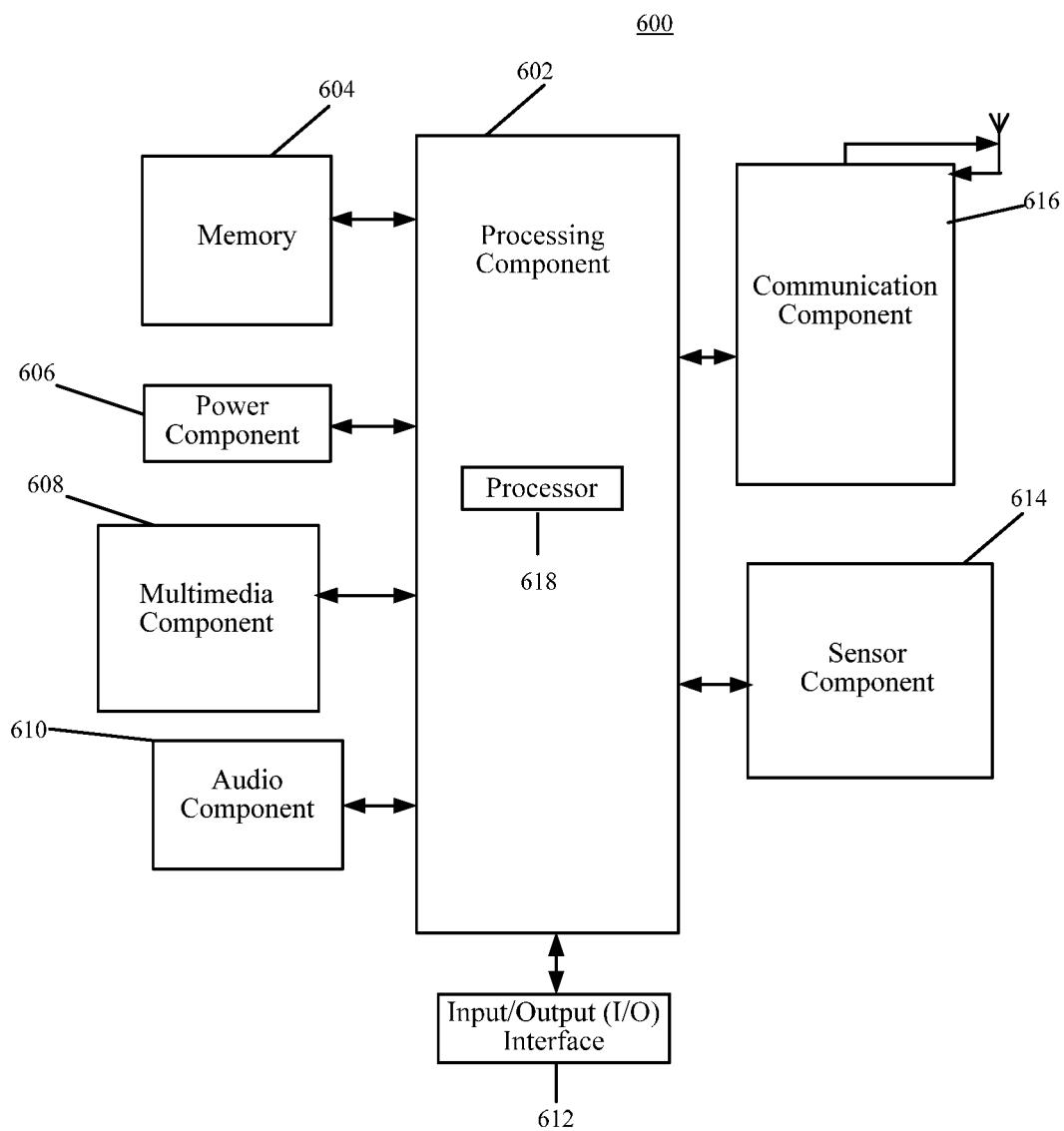
FIG. 6 is a block diagram of a device for establishing and removing a control relationship according to an exemplary embodiment.

FIG. 6 is a block diagram of a device 600 according to an exemplary embodiment. For example, the device 600 may be a mobile phone, a computer, a digital broadcast terminal, a messaging device, a gaming console, a tablet, a medical device, exercise equipment, a personal digital assistant, and the like. Device 600 may, for example, be an implementation of first terminal 120 or second terminal 140 or another terminal as described above.

Referring to FIG. 6, the device 600 may include one or more of the following components: a processing component 602, a memory 604, a power component 606, a multimedia component 608, an audio component 610, an input/output (I/O) interface 612, a sensor component 614, and a communication component 616.

The processing component 602 typically controls overall operations of the device 600, such as the operations associated with display, telephone calls, data communications, camera operations, and recording operations. The processing component 602 may include one or more processors 618 to execute instructions to perform all or part of the steps in the above described methods. Moreover, the processing component 602 may include one or more modules which facilitate the interaction between the processing component 602 and other components. For instance, the processing component 602 may include a multimedia module to facilitate the interaction between the multimedia component 608 and the processing component 602. In an embodiment, processing component 602 may include one or more modules configured to perform any or all of the functions, operations, or method steps described above as being performed by a terminal.

The memory 604 is configured to store various types of data to support the operation of the device 600. Examples of such data include instructions for any applications or methods operated on the device 600, contact data, phonebook data, messages, pictures, video, etc. The memory 604 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 606 provides power to various components of the device 600. The power component 606 may include a power management system, one or more power sources, and any other components associated with the generation, management, and distribution of power in the device 600).

The multimedia component 608 includes a screen providing an output interface between the device 600 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 608 includes a front camera and/or a rear camera. The front camera and the rear camera may receive an external multimedia datum while the device 600 is in an operation mode, such as a photographing mode or a video mode. Each of the front camera and the rear camera may be a fixed optical lens system or have focus and optical zoom capability.

The audio component 610 is configured to output and/or input audio signals. For example, the audio component 610 includes a microphone ("MIC") configured to receive an external audio signal when the device 600 is in an operation mode, such as a call mode, a recording mode, and a voice recognition mode. The received audio signal may be further stored in the memory 604 or transmitted via the communication component 616. In some embodiments, the audio component 610 further includes a speaker to output audio signals.

The I/O interface 612 provides an interface between the processing component 602 and peripheral interface modules, such as a keyboard, a click wheel, buttons, and the like. The buttons may include, but are not limited to, a home button, a volume button, a starting button, and a locking button.

The sensor component 614 includes one or more sensors to provide status assessments of various aspects of the device 600. For instance, the sensor component 614 may detect an open/closed status of the device 600, relative positioning of components, e.g., the display and the keypad, of the device 600, a change in position of the device 600 or a component of the device 600, a presence or absence of user contact with the device 600, an orientation or an acceleration/deceleration of the device 600, and a change in temperature of the device 600. The sensor component 614 may include a proximity sensor configured to detect the presence of nearby objects without any physical contact. The sensor component 614 may also include a light sensor, such as a CMOS or CCD image sensor, for use in imaging applications. In some embodiments, the sensor component 614 may also include an accelerometer sensor, a gyroscope sensor, a magnetic sensor, a pressure sensor, or a temperature sensor.

The communication component 616 is configured to facilitate communication, wired or wirelessly, between the device 600 and other devices. The device 600 may access a wireless network based on a communication standard, such as WiFi, 2G or 3G or a combination thereof. In one exemplary embodiment, the communication component 616 receives a broadcast signal or broadcast associated information from an external broadcast management system via a broadcast channel. In one exemplary embodiment, the communication component 616 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 600 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above methods for establishing, removing, or establishing and removing a control relationship at a first terminal side or at a second terminal side.

In exemplary embodiments, there is also provided a non-transitory computer-readable storage medium including instructions, such as included in the memory 604, executable by the processor 618 in the device 600, for performing the above-described methods. For example, the non-transitory computer-readable storage medium may be a ROM, a RAM, a CD-ROM, a magnetic tape, a floppy disc, an optical data storage device, and the like.

Figure 7:
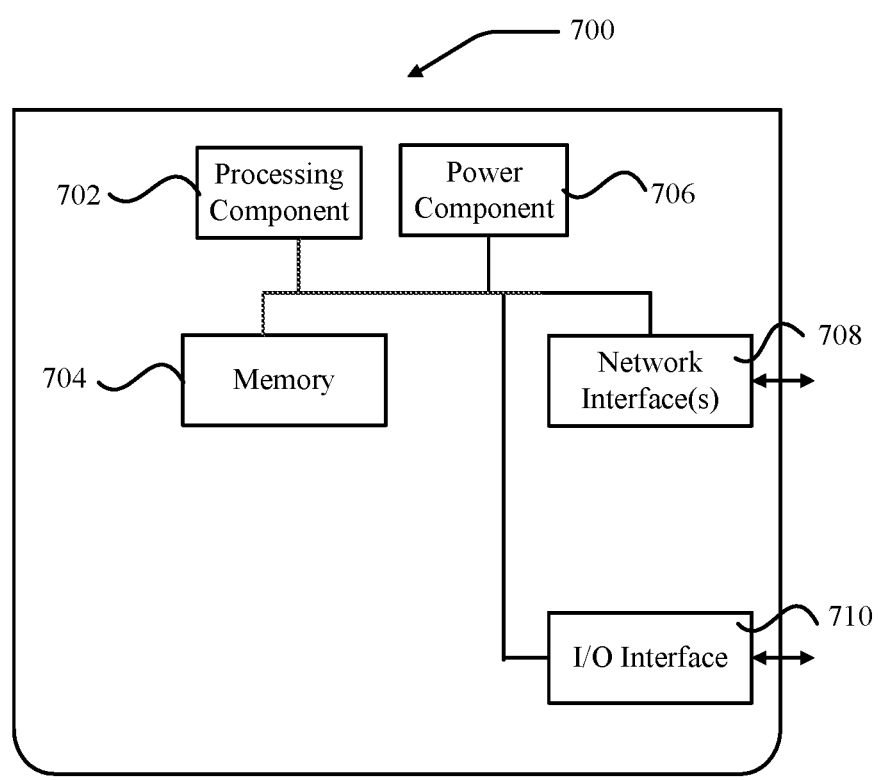
FIG. 7 is a block diagram of a device for establishing and removing a control relationship according to an exemplary embodiment.

FIG. 7 is a block diagram of a device for establishing, removing, or establishing and removing a control relationship according to another exemplary embodiment. For example, the device 700 may be provided as a device at a network side, and may for example be an implementation of server 160 or other servers discussed in this disclosure. Referring to FIG. 7, the device 700 includes a processing component 702 that further includes one or more processors, and memory resources represented by a memory 704 for storing instructions executable by the processing component 702, such as application programs. The application programs stored in the memory 704 may include one or more modules each corresponding to a set of instructions. Further, the processing component 702 is configured to execute the instructions to perform the above described methods for establishing, removing, or establishing and removing a control relationship at the server side.

Each module discussed above, such as request receiving module 410, retrieving module 412, first removing module 414, first receiving module 510, first forwarding module 512, first connecting module 514, first notification module 516, first rejecting module 518, second receiving module 520, second forwarding module 522, second connecting module 524, second notification module 526, second rejecting module 528, request receiving module 530, retrieving module 540, first removing module 550, and second removing module 560, may take the form of a packaged functional hardware unit designed for use with other components, a portion of a program code (e.g., software or firmware) executable by the processor 720 or the processing circuitry that usually performs a particular function of related functions, or a self-contained hardware or software component that interfaces with a larger system, for example.

The device 700 may also include a power component 706 configured to perform power management of the device 700, wired or wireless network interface(s) 708 configured to connect the device 700 to a network, and an input/output (I/O) interface 710. The device 700 may operate based on an operating system stored in the memory 704, such as Windows Server™, Mac OS X™, Unix™, Linux™, FreeBSD™, or the like.

The methods, devices, and modules described above may be implemented in many different ways and as hardware, software or in different combinations of hardware and software. For example, all or parts of the implementations may be a processing circuitry that includes an instruction processor, such as a central processing unit (CPU), microcontroller, a microprocessor; or application specific integrated circuits (ASICs), digital signal processors (DSPs), digital signal processing devices (DSPDs), programmable logic devices (PLDs), field programmable gate arrays (FPGAs), controllers, micro-controllers, microprocessors, other electronic components; or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Reference throughout this specification to "one embodiment," "an embodiment," "exemplary embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may be combined in any suitable manner.

The terminology used in the description of the disclosure herein is for the purpose of describing particular examples only and is not intended to be limiting of the disclosure. As used in the description of the disclosure and the appended claims, the singular forms "a," "an," and "the" are intended to include the plural forms as well, unless the context clearly indicates otherwise. Also, as used in the description herein and throughout the claims that follow, the meaning of "in" includes "in" and "on" unless the context clearly dictates otherwise. It will also be understood that the term "and/or" as used herein refers to and encompasses any and all possible combinations of one or more of the associated listed items. It will be further understood that the terms "may include," "including," "comprises," and/or "comprising," when used in this specification, specify the presence of stated features, operations, elements, and/or components, but do not preclude the presence or addition of one or more other features, operations, elements, components, and/or groups thereof.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for removing a control relationship, which is applied in a server, the method comprising:
   receiving, by the server, a removal request from a first user account, the removal request configured to request removal of a control relationship between the first user account and a device;
   determining, by the server, whether the first user account is an owner account of the device or a share account of the device; and
   when the first user account is determined to be an owner account of the device:
      retrieving, by the server, a first share account corresponding to the device, the first share account being an account having permission to control the device, wherein the permission to control the device has been shared with the first share account by a user account different from the first share account;
      removing, by the server, a full control relationship between the owner account and the device; and
      automatically removing, by the server, a limited control relationship between the first share account and the device once the full control relationship between the owner account and the device is removed.

2. The method of claim 1, wherein the method further comprises:
   when the first user account is determined to be a share account of the device, removing a limited control relationship between the first user account and the device.

3. The method of claim 1, wherein the method further comprises, prior to receiving the removal request from the first user account:
   receiving a first sharing offer from the owner account to the first share account;
   forwarding the received first sharing offer to the first share account; and
   in response to receipt from the first share account of an accepting message configured to accept the first sharing offer, establishing the limited control relationship between the first share account and the device.

4. The method of claim 2, wherein the method further comprises, prior to receiving the removal request from the first user account:
   receiving a first sharing offer from an owner account to the first share account;
   forwarding the received first sharing offer to the first share account; and
   in response to receipt from the first share account of an accepting message configured to accept the first sharing offer, establishing the limited control relationship between the first share account and the device.

5. The method of claim 3, wherein the method further comprises, prior to receiving the removal request from the first user account:
   receiving a second sharing offer from the first share account to a second share account;
   forwarding the received second sharing offer to the second share account; and
   in response to receipt from the second share account of an accepting message configured to accept the second sharing offer, establishing a limited control relationship between the second share account and the device.

6. The method of claim 4, wherein the method further comprises, prior to receiving the removal request from the first user account:
   receiving a second sharing offer from the first share account to a second share account;
   forwarding the received second sharing offer to the second share account; and
   in response to receipt from the second share account of an accepting message configured to accept the second sharing offer, establishing a limited control relationship between the second share account and the device.

7. The method of claim 5, wherein the method further comprises, prior to receiving the removal request from the first user account:
   sending a notification message to the owner account, the notification message configured to indicate that the second share account has established a limited control relationship with the device through permission to control the device shared with the second share account by the first share account.

8. The method of claim 6, wherein the method further comprises, prior to receiving the removal request from the first user account:
   sending a notification message to the owner account, the notification message configured to indicate that the second share account has established a limited control relationship with the device through permission to control the device shared with the second share account by the first share account.

9. A device for terminating a control relationship, which is applied in a server, the device comprising:
   a processor; and
   a memory for storing instructions executable by the processor;

wherein the processor is configured to:
receive a removal request from a first user account, the removal request being configured to request removal of a control relationship between the first user account and a device;
determine whether the first user account is an owner account of the device or a share account of the device; and
when the first user account is determined to be an owner account of the device:
retrieve a first share account corresponding to the device, the first share account being an account having a permission to control the device, wherein the permission to control the device has been shared with the first share account by a user account different from the first share account;
remove a full control relationship between the owner account and the device; and
automatically remove a limited control relationship between the first share account and the device once the full control relationship between the owner account and the device is removed.

10. The device of claim 9, wherein the processor is further configured to:
when the first user account is determined to be a share account of the device, remove a limited control relationship between the device and the first user account.

11. The device of claim 9, wherein the processor is further configured to:
receive a first sharing offer from an owner account to a first share account;
forward the received first sharing offer to a first share account; and
in response to receipt from the first share account of an accepting message configured to accept the first sharing offer, establish a limited control relationship between the first share account and the device.

12. The device of claim 10, wherein the processor is further configured to:
receive a first sharing offer from an owner account to a first share account;
forward the received first sharing offer to a first share account; and
in response to receipt from the first share account of an accepting message configured to accept the first sharing offer, establish a limited control relationship between the first share account and the device.

13. The device of claim 11, wherein the processor is further configured to:
receive a second sharing offer from the first share account to a second share account;
forward the received second sharing offer to the second share account; and
in response to receipt from the second share account of an accepting message configured to accept the second sharing offer, establish a limited control relationship between the second share account and the device.

14. The device of claim 12, wherein the processor is further configured to:
receive a second sharing offer from the first share account to a second share account;
forward the received second sharing offer to the second share account; and
in response to receipt from the second share account of an accepting message configured to accept the second sharing offer, establish a limited control relationship between the second share account and the device.

15. The device of claim 13, wherein the processor is further configured to:
send a notification message to the owner account, the notification message configured to indicate that the second share account has established a limited control relationship with the device through permission to control the device shared with the second share account by the first share account.

16. The device of claim 14, wherein the processor is further configured to perform:
send a notification message to the owner account, the notification message configured to indicate that the second share account has established a limited control relationship with the device through permission to control the device shared with the second share account by the first share account.

17. A non-transitory computer-readable storage medium having stored therein instructions for terminating a control relationship, the instructions configured to, when executed by a processor of a server, cause the server to:
receive a removal request from a first user account, the removal request being configured to request removal of a control relationship between the first user account and a device;
determine whether the first user account is an owner account of the device or a share account of the device; and
when the first user account is determined to be an owner account of the device:
retrieve a first share account corresponding to the device, the first share account being an account having a permission to control the device, wherein the permission to control the device has been shared with the first share account by a user account different from the first share account;
remove a full control relationship between the owner account and the device; and
automatically remove a limited control relationship between the first share account and the device once the full control relationship between the owner account and the device is removed.

18. The non-transitory computer-readable storage medium of claim 17, wherein the instructions are further configured to, when executed by a processor of the server, cause the server to:
when the first user account is determined to be a share account of the device, remove a limited control relationship between the device and the first user account.

19. The non-transitory computer-readable storage medium of claim 17, wherein the instructions are further configured to, when executed by a processor of the server, cause the server to:
receive a first sharing offer from an owner account to a first share account;
forward the received first sharing offer to a first share account; and
in response to receipt from the first share account of an accepting message configured to accept the first sharing offer, establish a limited control relationship between the first share account and the device.

20. The non-transitory computer-readable storage medium claim 19, wherein the instructions are further configured to, when executed by a processor of the server, cause the server to:
receive a second sharing offer from the first share account to a second share account;

forward the received second sharing offer to the second share account; and in response to receipt from the second share account of an accepting message configured to accept the second sharing offer, establish a limited control relationship between the second share account and the device.

* * * * *